US012623168B2

(12) United States Patent
Handt et al.

(10) Patent No.: US 12,623,168 B2
(45) Date of Patent: May 12, 2026

(54) MODULAR DEVICE FOR FIXEDLY ARRANGING AND INTERCONNECTING INDIVIDUAL SEPARATION UNITS AND/OR FUNCTION UNITS AMONGST ONE ANOTHER

(71) Applicant: Sartorius Stedim Biotech GmbH, Goettingen (DE)

(72) Inventors: Sebastian Handt, Goettingen (DE); Florian Mieth, Goettingen (DE); Heino Heise, Goettingen (DE); Lukas Becker, Goettingen (DE); Jannik Dippel, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 361 days.

(21) Appl. No.: 18/030,761

(22) PCT Filed: Oct. 7, 2021

(86) PCT No.: PCT/EP2021/077775
§ 371 (c)(1),
(2) Date: Apr. 6, 2023

(87) PCT Pub. No.: WO2022/074151
PCT Pub. Date: Apr. 14, 2022

(65) Prior Publication Data
US 2023/0372844 A1 Nov. 23, 2023

(30) Foreign Application Priority Data
Oct. 8, 2020 (EP) .................................... 20200819

(51) Int. Cl.
*B01D 29/90* (2006.01)
*B01D 35/147* (2006.01)
*B01D 35/30* (2006.01)

(52) U.S. Cl.
CPC ......... *B01D 29/90* (2013.01); *B01D 35/1475* (2013.01); *B01D 35/303* (2013.01);
(Continued)

(58) Field of Classification Search
CPC .. B01D 29/90; B01D 35/1475; B01D 35/303; B01D 2201/165; B01D 2201/302;
(Continued)

(56) References Cited

U.S. PATENT DOCUMENTS

| 3,945,935 A | 3/1976 | Nicholson, Jr. |
| 5,405,528 A * | 4/1995 | Selbie .................. B01D 63/046 |
| | | 210/232 |

(Continued)

FOREIGN PATENT DOCUMENTS

| CN | 206645872 U | 11/2017 |
| CN | 109999558 A | 7/2019 |

(Continued)

*Primary Examiner* — Waqaas Ali
(74) *Attorney, Agent, or Firm* — Dilworth IP, LLC

(57) ABSTRACT

A modular device for a fixed arrangement and interconnection of individual separation units and/or first functional units for performing one or more unit operations in a biotechnological process. The modular device includes a plurality of distributor caps provided for attachment to the separation units and/or first functional units. The distributor caps each have: a fluid distribution mechanism having a working connection and at least two supply or discharge connections, wherein the fluid distribution mechanism can assume at least two defined switching positions; connection mechanisms for establishing a flow communication between a fluid inlet or outlet of the separation unit or the first functional unit and the working connection of the fluid distribution mechanism; coupling mechanisms for establishing a rigid mechanical coupling and a flow communication with an adjacent distributor cap; and an interface for chang- (Continued)

ing the switching positions of the fluid distribution mechanism.

14 Claims, 8 Drawing Sheets

(52) U.S. Cl.
CPC .. *B01D 2201/165* (2013.01); *B01D 2201/302* (2013.01); *B01D 2221/10* (2013.01)

(58) Field of Classification Search
CPC ............ B01D 2221/10; B01D 2313/06; B01D 2313/105; B01D 2313/125; B01D 2313/44; B01D 35/147; B01D 35/153; B01D 65/00; B01D 2053/221; B01D 2313/54; B01D 53/0407; B01D 35/1573; B01D 35/306; B01D 69/14; G01N 30/46; G01N 30/60

See application file for complete search history.

(56) References Cited

U.S. PATENT DOCUMENTS

| | | | |
|---|---|---|---|
| 5,614,091 A | 3/1997 | Janik et al. | |
| 5,753,107 A | 5/1998 | Magnusson et al. | |
| 6,926,826 B2 | 8/2005 | Reid | |
| 11,325,056 B2 | 5/2022 | Olschok et al. | |
| 2002/0050296 A1 | 5/2002 | Ozawa | |
| 2003/0217958 A1 | 11/2003 | Reid | |
| 2015/0108050 A1 | 4/2015 | Maggiore et al. | |
| 2015/0354712 A1 | 12/2015 | Jensen et al. | |
| 2021/0260498 A1 | 8/2021 | Olschok et al. | |

FOREIGN PATENT DOCUMENTS

| | | | |
|---|---|---|---|
| DE | 3313539 A1 | 10/1984 | |
| DE | 19833381 A1 | 1/2000 | |
| DE | 60310691 T2 | 12/2007 | |
| DE | 102018004096 A1 | 11/2019 | |
| EP | 1520612 A1 | 4/2005 | |
| EP | 1051226 B1 | 12/2007 | |
| EP | 2952791 A1 | 12/2015 | |
| JP | H5508801 A | 12/1993 | |
| JP | 2001248777 A | 9/2001 | |
| JP | 2010518330 A | 5/2010 | |
| JP | 2022130574 A | 9/2022 | |
| WO | 91161124 | 10/1991 | |
| WO | 2008094707 A1 | 8/2008 | |
| WO | WO-2012078677 A2 * | 6/2012 | ............. C12P 21/00 |

* cited by examiner

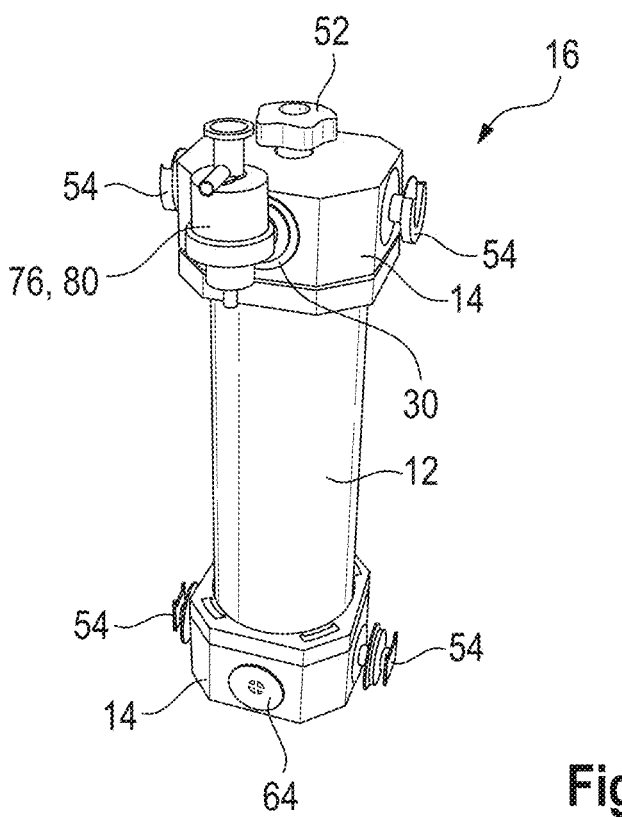
Fig. 3
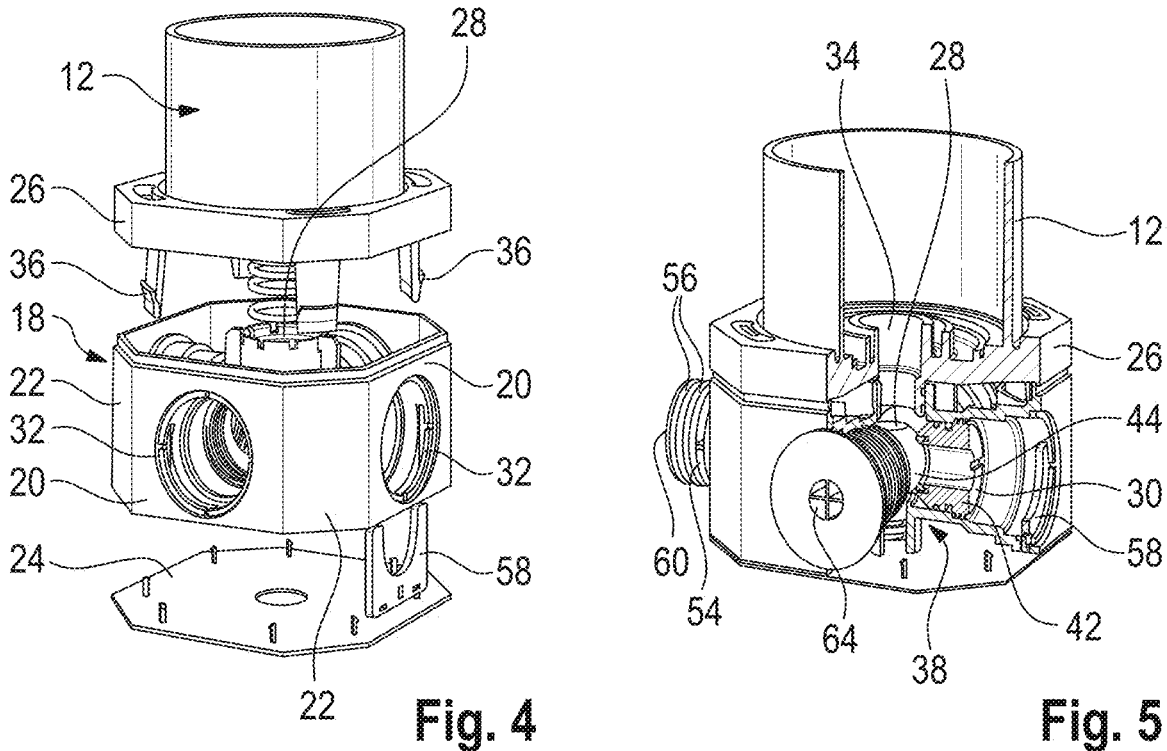
Fig. 4          Fig. 5

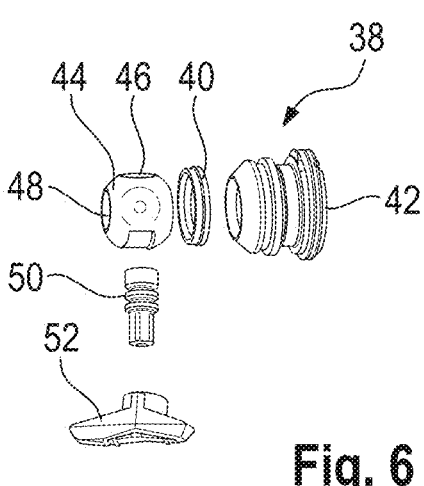
Fig. 6
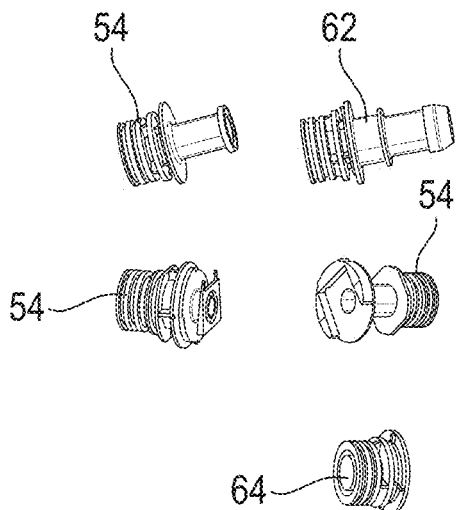
Fig. 7
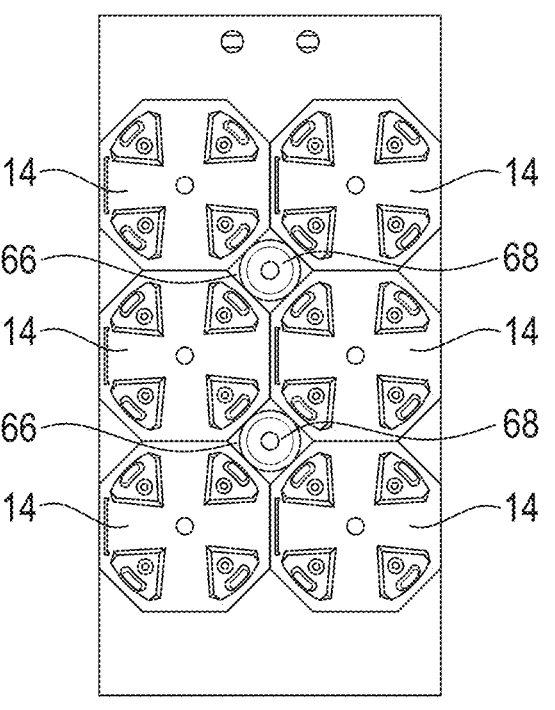
Fig. 8
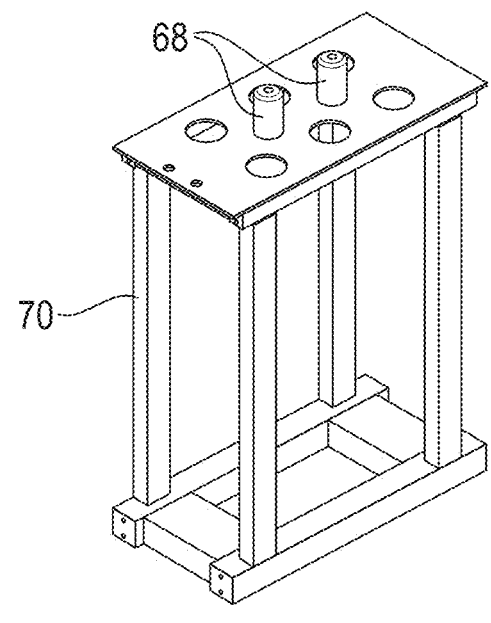
Fig. 9

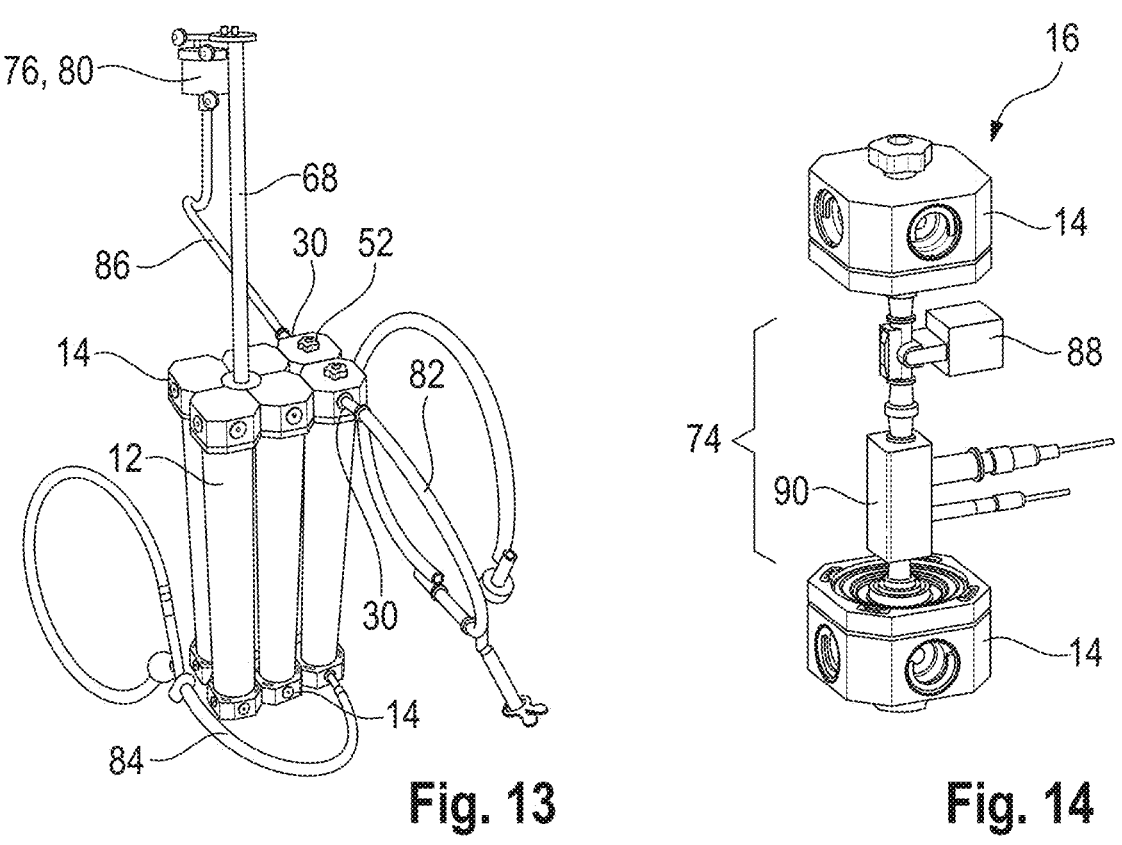
Fig. 13
Fig. 14
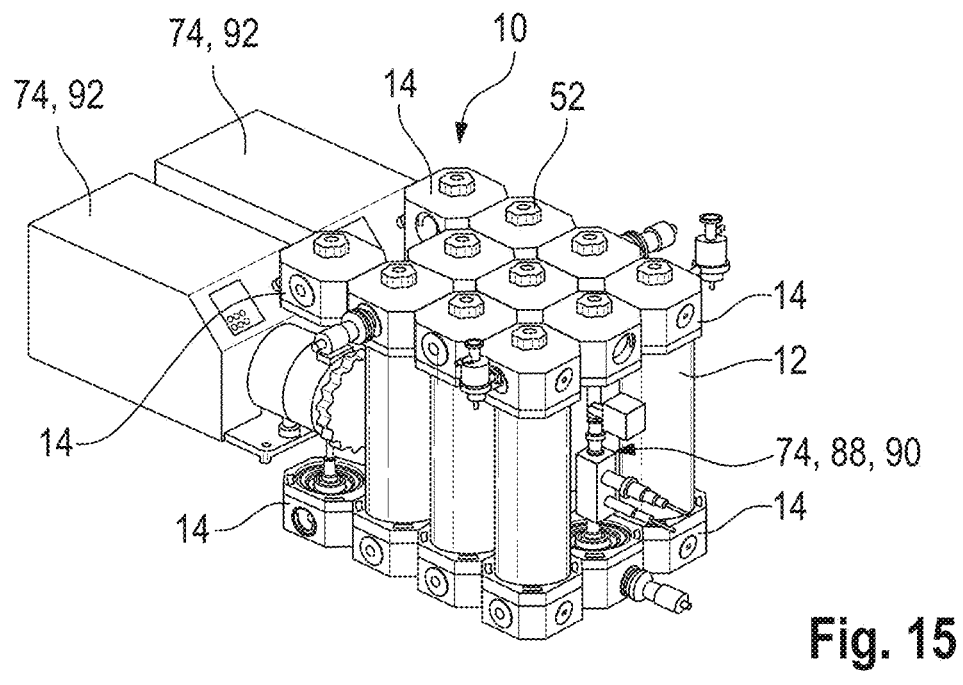
Fig. 15

MODULAR DEVICE FOR FIXEDLY ARRANGING AND INTERCONNECTING INDIVIDUAL SEPARATION UNITS AND/OR FUNCTION UNITS AMONGST ONE ANOTHER

FIELD OF THE INVENTION

The invention relates to a modular device for a fixed arrangement and interconnection of individual separation units and/or functional units for performing one or more unit operations in a biotechnological process. The invention further relates to a process device arrangement for performing one or more unit operations in a biotechnological process.

BACKGROUND

In the field of downstream processing, separation units such as filter capsules, chromatography columns or membrane adsorbers are used. Currently, such separation units and possibly further functional units (sensors, pumps, mixers, etc.) are interconnected by means of hoses and/or piping to be able to perform a specific process step.

Such a conventional process arrangement requires a lot of space and is very unwieldy, also because many components of the arrangement have to be fixed. In addition, such an arrangement has large dead spaces, which on the one hand involves the risk of undesired back-mixing and on the other hand constitutes an obstacle to a desired maximum product yield. This is particularly important in the production of high-quality biopharmaceutical active substances. A further disadvantage of a conventional process arrangement is that before further separation steps are performed in the downstream process, the medium to be purified must be temporarily stored in a complicated manner, e.g. in a separate tank or in bags, since currently, there is a lack of compatibility of the interfaces of these intermediate steps (pressure-sensitive, no sterile barrier, no suitable connections, etc.).

SUMMARY

The object of the invention is to make it easier and more flexible to perform one or more unit operations in a biotechnological process, in particular in a downstream process.

This object is achieved by a modular device having the features of claim 1. Advantageous and useful embodiments of the modular device according to the invention are specified in the subclaims.

The modular device according to the invention serves for a fixed arrangement and interconnection of individual separation units and/or first functional units for performing one or more unit operations in a biotechnological process. The modular device comprises a plurality of distributor caps, of which at least one distributor cap is provided for attachment to a separation unit and one or more further distributor caps are each provided for attachment to a further separation unit or a first functional unit. The distributor caps each have:

a fluid distribution means having a working connection and at least two supply or discharge connections, wherein the fluid distribution means can assume at least two defined switching positions;

connection means for establishing a flow communication between a fluid inlet or outlet of the separation unit or the first functional unit and the working connection of the fluid distribution means;

coupling means for establishing a rigid mechanical coupling and a flow communication with an adjacent distributor cap; and an interface for manually or automatically changing the switching positions of the fluid distribution means.

Separation units are here understood to be filter capsules, chromatography columns, membrane adsorbers or similar units typically used in a downstream process for separating biopharmaceutical products. Other functional units, here referred to as first functional units, which serve other purposes in the context of process performance or control are to be distinguished therefrom. Such a first functional unit may be, for example, a pump (head), a sensor (arrangement), a static mixer, a reservoir or intermediate storage tank, a sampling means or a venting means, wherein the first functional unit may also comprise only functionally essential parts of such units. A first functional unit can also simply be an empty pipe used, for example, as a bypass for transporting medium.

The distributor caps are primarily intended for attachment to separation units, which in turn are intended for performing the respective unit operation in the biotechnological process. The connection means of the distributor caps establish a flow communication between a fluid inlet or outlet of the separation unit and the working connection of the fluid distribution means. However, the connection means of the distributor caps also allow them to be attached to other (first) functional units. In this case, the connection means of the distributor caps establish a flow communication between a fluid inlet or outlet of the first functional unit and the working connection of the fluid distribution means.

This means that for performing the desired unit operation(s), at least one, preferably a plurality of separation units are in any case provided with a distributor cap and, if necessary, further first functional units are also interconnected by means of such distributor caps to form a process device arrangement.

Each distributor cap is coupled to at least one further adjacent distributor cap via the coupling means thereof (which are to be distinguished from the previously mentioned connection means). Such a coupling indicates both a rigid mechanical coupling and a flow communication with the adjacent distributor cap, preferably between a supply or discharge connection of the fluid distribution means of one distributor cap and a supply or discharge connection of the fluid distribution means of the adjacent distributor cap.

The supply or discharge connections of the fluid distribution means of the distributor caps are basically suitable both for supplying and discharging fluid. The actual function of each individual connection results from the final interconnection of the distributor caps with the associated separation units or first functional units in the specific application.

The device according to the invention may also comprise further distributor caps which are not attached to a separation unit or a first functional unit via their connection means, but are only coupled to at least one other distributor cap via their coupling means. In particular, such distributor caps may be coupled on their free sides via further coupling means to second functional units, such as a sensor, a sampling means or a venting means. Such second functional units, which are not coupled to the working connection but to a supply or discharge connection of the distributor cap, are usually smaller and/or lighter than the first functional units described above, which are provided for coupling to the working connection of the distributor cap. Of course, a distributor cap may be coupled both to a first functional unit and additionally to one or more second functional units.

The modular character of the device according to the invention is to be particularly emphasized. The distributor caps allow different interconnections of the connected separation units and, if applicable, first functional units, so that individually configurable process device arrangements are made possible. Serial or parallel operation of the separation units and, if applicable, the first functional units can be realized by means of correspondingly connected fluid distribution means.

In particular, serially interconnected separation units enable the sequential, uninterrupted execution of various partial steps, e.g. prefiltration and sterile filtration, chromatography, clarification, ultrafiltration/diafiltration, dilution and conditioning (pH adjustment, etc.), virus filtration and virus inactivation as well as depth filtration. The need for intermediate storage of medium in containers is thus significantly reduced or even unnecessary, so that less production space is required in the laboratory. A parallel interconnection of a plurality of separation units of the same type leads to an increase in capacity and/or flow rate. A combination of serial and parallel interconnection may also be useful, so that specific serial steps have an increase in capacity. Other branched configurations with different operating modes within one arrangement are also possible, such as the integration of a dwell loop to ensure a dwell time in a module.

The switching position of the fluid distribution means of each distributor cap required for the respective operating mode can be set manually or also (partially) automatically via the interface.

Regardless of the selected interconnection of the distributor caps with the associated separation units and, if applicable, first functional units, all distributor caps together form a compact and stable assembly due to the rigid mechanical coupling therebetween, so that the entire arrangement (including the separation units and, if applicable, the first functional units) constitutes a pre-assembled unit which can be transported, set up and put into operation as a whole. The pre-assembly may already take place at the manufacturer's premises, so that any errors on the part of the user can be excluded.

The assembling into a compact and stable unit proves to be particularly advantageous if the arrangement consists of disposable components and is intended for one-time use, as the arrangement can then also be disposed of as a whole after use. This means that the components do not have to be separated before disposal so that they fit into the containers provided therefor, but can be transported away as a compact unit and disposed of together. If necessary, a (partial) separation of the components before disposal may also be provided, in particular at previously defined disassembly points.

A further significant advantage of the device according to the invention is that no additional hoses or pipes and interconnected valves are required to establish the necessary flow communications between the separation units and, if applicable, first functional units. Apart from the fact that such couplings require a lot of space, the connection of the hoses or pipes to the separation units and the valves is fundamentally prone to errors and also involves the risk of contamination. However, in the device according to the invention, the flow communications are realized directly via the coupling means and the fluid distribution means of the distributor caps without requiring additional space. A compact arrangement of the distributor caps—preferably in one plane—in which both the dead spaces and the leakage possibilities are minimized is thus achieved. The latter is particularly important with regard to the limited pressure stability of hoses. The flow communications established by use of the coupling means are short and rigid and can accordingly be designed to be much more stable.

Compared to previous process arrangements, the predetermined, protected (i.e. not exposed) couplings of the distributor caps to each other and the elimination of intermediate storage of medium ensure significantly increased safety before, during and after operation, also with regard to product sterility.

The distributor caps of the device according to the invention are preferably attached to a (front side) end of a housing of a separation unit or a first functional unit, so that the separation unit or the first functional unit and the associated distributor cap form a firm assembly. Therefore, in addition to the connection means for establishing the necessary flow communication between the working connection of the fluid distribution means of the distributor cap and the fluid inlet or outlet of the separation unit or the first functional unit, the distributor caps preferably also comprise mounting means for fixedly attaching the distributor cap to such a housing end.

A particular flexibility of the device according to the invention results from the fact that all or at least a plurality of the distributor caps have essentially the same shape and the same size and the supply or discharge connections, if any, are each arranged at the same location. The mounting means for fixedly attaching the distributor cap also preferably have a uniform design. Thus, the distributor caps represent a standard of compatibility which not only offers a wide range of possible applications (easily configurable interconnection of separation units and possibly first functional units). The desired arrangements can also be easily planned in advance, since the individual, identically designed distributor caps with their associated separation units and, if applicable, first functional units can be fitted together almost arbitrarily, without having to pay attention to individual connection accessories.

A design of the distributor caps in which the supply or discharge connections of the fluid distribution means lie in a plane that is preferably oriented perpendicularly to an axial direction of the working connection is particularly preferred. Such a design is optimally adapted to separation units the fluid inlet or outlet of which is arranged at a front side end. The distributor cap is then placed onto this end like an (additional) cover. The working connection of the fluid distribution means of the distributor cap is then coupled to the fluid inlet or outlet of the separation unit. The supply or discharge connections of the fluid distribution means of the distributor cap are then available on the free sides of the distributor cap perpendicular thereto. As the supply or discharge connections of the distributor cap all lie in the same plane, the coupling of a plurality of distributor caps results in a flat (not stepped) assembly that is easy to handle.

In the preferred embodiment of the invention, the fluid distribution means of the distributor cap includes four supply or discharge connections arranged at angular intervals of 90°. The coupling of the distributor caps then results in simple, predictable patterns.

With regard to a particularly space-saving and flexible relative arrangement possibility of the distributor caps to be coupled to each other, the recommended basic shape for the distributor caps is that of a straight cylinder, which according to the mathematical definition includes straight prisms.

Accordingly, the base and top surfaces of the distributor caps are substantially circular or an equiangular polygon, preferably an octagon.

The fluid distribution means of the distributor cap basically provides flow communications between the working connection provided for coupling to the fluid inlet or outlet of a separation unit or a first functional unit, and any present supply or discharge connections, each of which can be coupled to either a supply or discharge connection of an adjacent distributor cap or a second functional unit. The at least two switching positions of the fluid distribution means enable, depending on the embodiment:

the selective opening or blocking of a flow communication between the working connection and at least one supply or discharge connection; and/or the selective opening or blocking of flow communications between the working connection and a plurality of specific or all supply or discharge connections.

For this purpose, the fluid distribution means preferably comprises at least one valve, preferably a ball valve and/or a diaphragm valve.

The valve may in particular be a multi-way valve with a plurality of valve positions, by means of which different flow communications between the working connection and the supply or discharge connections and/or between the supply or discharge connections to each other can be set, the working connection preferably being arranged centrally in the distributor cap with respect to a plane perpendicular to its axial direction.

In specific separation units, in particular in specific types of filter capsules or membrane adsorbers, the fluid inlet and the fluid outlet are both arranged on the same end face (at the bottom in the operating position). Typically, the fluid outlet is located centrally and the fluid inlet is radially offset with respect to the central axis of these substantially cylindrically shaped separation units. For this type of separation units, hereinafter referred to for convenience as the T-style variant, the invention provides a distributor cap in which the working connection is arranged to be radially offset with respect to the central fluid outlet of the separation unit, so that when the distributor cap is attached to the separation unit, the working connection is brought into flow communication with the correspondingly offset fluid inlet of the separation unit. The central fluid outlet of the separation unit is brought into flow communication with one or more discharge connections of the distributor cap by means of the fluid distribution means.

In accordance with the basic idea of the invention, it is also possible to combine the above-described T-style variant of the distributor cap with a first functional unit, e.g. a sensor arrangement, rather than with a separation unit. In this case, the working connection of the distributor cap is connected to the fluid inlet of the first functional unit, and a supply or discharge connection of the distributor cap is connected to the fluid outlet of the first functional unit, or vice versa.

For the T-style variant of the distributor cap, a ball valve is suitable as a valve in the fluid distribution means, which can be brought into at least two different valve positions via a centrally arranged actuating element and a bevel gear. Alternatively, a diaphragm valve can also be used here.

Suitable connectors, preferably sterile connectors, hose barbs or blind plugs, may be attached to the supply or discharge connections of the fluid distribution means of the distributor cap, which are preferably each fixed by a securing element, which further preferably snaps into a latching means formed on a housing of the distributor cap.

As already mentioned, at least in one distributor cap, a second functional unit, such as a sensor, a sampling device or a venting device, can be connected to at least one of the supply or discharge connections. (The connection of such a "second" functional unit does not require that a first functional unit must also be connected to the working connection of the distributor cap). If a second functional unit is provided, the respective coupling means of the distributor cap are used to establish a rigid mechanical coupling and a flow communication with the second functional unit. Thus, the second functional units are also part of the overall rigid assembly of the distributor caps.

As a protective measure, an overpressure protection means, in particular a pressure relief valve or a burst diaphragm, may be attached to at least one working connection or supply or discharge connection.

The invention also provides a process device arrangement for performing one or more unit operations in a biotechnological process, comprising at least one separation unit and at least one further separation unit and/or a first functional unit. The process device arrangement according to the invention further comprises a modular device as defined above, by means of which the separation unit and the further separation unit and/or the first functional unit are fixedly arranged relative to each other and interconnected. Due to the modular character of the distributor caps and the adjustable fluid distribution means thereof, it is possible to connect the separation units in parallel or in series. More complex arrangements with branches connected in parallel and/or series are also possible.

The process device arrangement according to the invention can advantageously be used to divide a large volume of medium into a plurality of small containers (sub-volumes). For this purpose, it is provided, among others, that a plurality of supply or discharge connections of different distributor caps are coupled to individual containers.

In particular with regard to an at-line analysis during the running process, it may be provided that a supply or discharge connection of a distributor cap or a first functional unit is coupled to an analytical metric.

To reduce the footprint of the process device arrangement according to the invention, a plurality of sub-units, each comprising a separation unit or a first functional unit and at least one distributor cap, may be combined to form module assemblies. These module assemblies can then be stacked on top of each other.

Flow communications between the module assemblies can be easily established via coupling lines which are connected to free lateral supply or discharge connections of the distributor caps.

In particular for parallel connection of interlinked separation units, flow communications between the module assemblies stacked on top of each other may also be established by vertically aligned coupling connections of the fluid distribution means of the distributor caps opposite the working connections.

Current trends in the biopharmaceutical industry increasingly point in the direction of using disposable components. These are now used not only in the field of product and process development, but also in the field of clinical trial manufacturing (CTM) for the approval process, and even in commercial good manufacturing practice (GMP) in the production of medicinal products. Therefore, one embodiment of the process device arrangement according to the invention is preferred in which both the distributor caps and all units of the process device arrangement attached to the distributor caps are configured as disposable components, and preferably the entire process device arrangement is pre-sterilized prior to putting into operation, so that it is ready for immediate use.

BRIEF DESCRIPTION OF THE DRAWINGS

Further features and advantages of the invention will become apparent from the description below and from the accompanying drawings, to which reference is made and in which:

FIG. 3 shows a sub-unit (module) of the process device arrangement of FIG. 1;

FIG. 4 shows an exploded view of a distributor cap according to a first embodiment;

FIG. 5 shows a partial sectional view of the distributor cap of FIG. 4 with inserted connector and blind plug;

FIG. 6 shows individual components of a fluid distribution means;

FIG. 7 shows various connectors and a blind plug;

FIG. 8 shows a unit of distributor caps;

FIG. 9 shows a frame for receiving a process device arrangement according to the invention;

FIG. 13 shows a process device arrangement according to the invention with a venting unit connected via a hose line;

FIG. 14 shows a sub-unit (module) of a process device arrangement according to the invention with a first functional unit in the form of a sensor arrangement instead of a separation unit;

FIG. 15 shows a process device arrangement according to the invention with the sub-unit (module) of FIG. 14;

DETAILED DESCRIPTION

Figure 1:
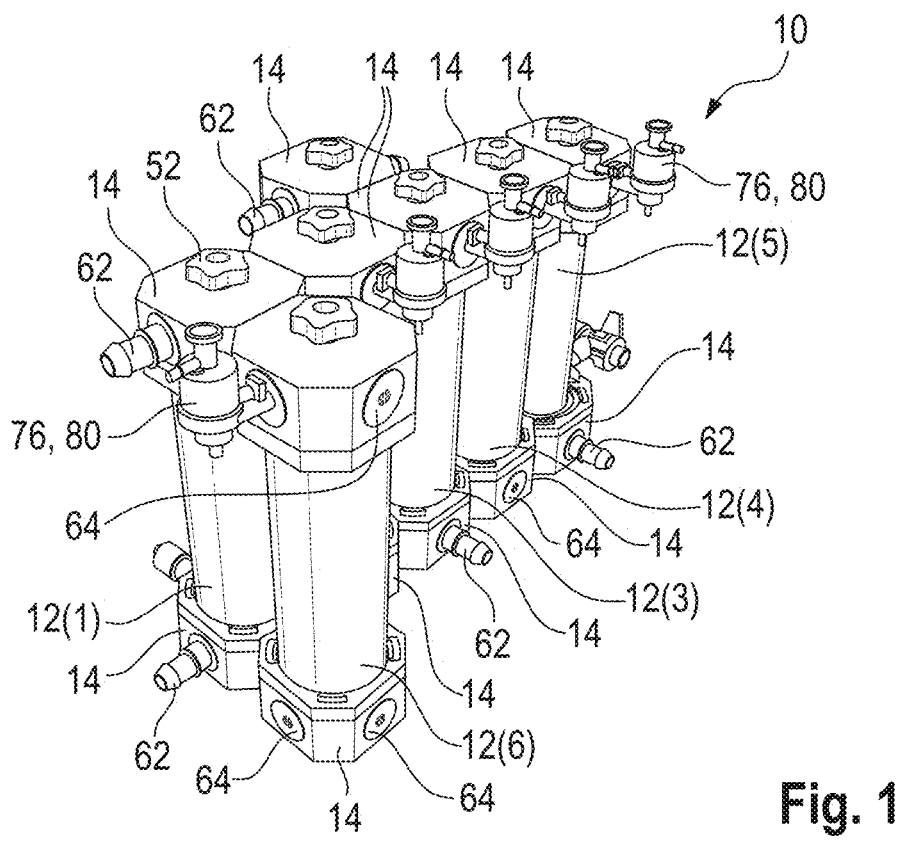
FIG. 1 shows a process device arrangement according to the invention for performing one or more unit operations in a biotechnological process with a modular device according to the invention for the fixed arrangement and interconnection of individual separation units and/or first functional units.
Figure 2:
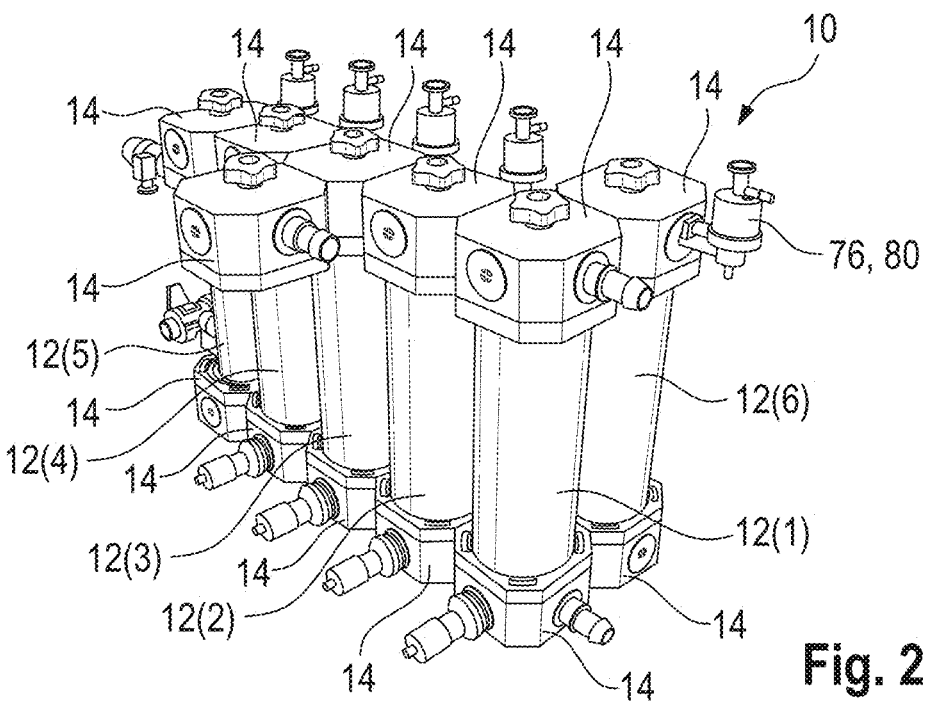
FIG. 2 shows another view of the process device arrangement of FIG. 1.

FIGS. 1 and 2 show an example of a process device arrangement 10 for performing one or more unit operations in a biotechnological process. The process device arrangement 10 comprises a plurality of separation units 12, which may differ in terms of separation technology (e.g. filter capsule, chromatography column, membrane adsorber) and/or filter material and/or structure and/or size and/or other parameters. The separation units 12 are interconnected by means of a modular device. This modular device is formed by a plurality of individual distributor caps 14, each of which is coupled to at least one adjacent distributor cap 14.

In the illustrated example embodiment, all distributor caps 14 have the same basic structure, and each distributor cap 14 is assigned to a separation unit 12 and is firmly attached thereto, so that altogether a compact and stable process device arrangement 10 comprising separation units 12 arranged in a defined manner (in a grid) is obtained.

FIG. 3 shows—also by way of example—a sub-unit (module) 16 of the process device arrangement 10 comprising a separation unit 12, which has a substantially cylindrical basic shape, and two distributor caps 14, which are attached to the two end faces of the separation unit 12.

FIGS. 4 and 5 show the basic structure of a first variant of the distributor caps 14. The distributor cap 14 has a housing 18 which is substantially in the shape of a straight prism, the base and top surfaces of which are in turn substantially in the form of an equiangular polygon, here an octagon. Four main side walls 20 oriented at right angles to each other are coupled to each other by intermediate secondary side walls 22. On one end face, the housing 18 is closed by a lid 24, on the other end face, the housing 18 is open and covered by a bottom or lid portion 26 (depending on whether the distributor cap 14 is placed on the bottom or on the top of the separation unit 12 with respect to the operating position of the separation unit 12) of the associated separation unit 12, which is not fully shown in FIGS. 4 and 5.

A fluid distribution means having a central working connection 28 accessible through the open side of the housing and a plurality of lateral supply or discharge connections 30 are located inside the housing 18. The supply or discharge connections 30 of the fluid distribution means lie in a plane oriented perpendicularly to the axial direction of the working connection 28. In the fluid distribution means shown here, four supply or discharge connections 30 are provided, which are arranged at angular intervals of 90° and are accessible through corresponding openings 32 in the main side walls 20 of the housing 18.

The distributor cap 14 further comprises connection means by means of which a flow communication between a fluid inlet or outlet 34 of the separation unit 12 and the working connection 28 of the fluid distribution means is established when the distributor cap 14 is placed onto the bottom or lid portion 26 of the separation unit 12. Mounting means 36 (latching elements or the like) are used to fix the distributor cap 14 to the bottom or lid portion 26 of the separation unit 12. The bottom or lid portions 26 of all separation units 12 are adapted to the connection means and mounting means 36 of the distributor caps 14 arranged and designed in a standardized manner.

In this variant, the fluid distribution means is substantially formed by a multi-way valve which provides the aforementioned connections and can assume different switching positions. The essential components of this valve, which is designed here as a ball valve 38, are shown individually in FIG. 6. A ball 44 having bores 46, 48 and which is sealed by a sealing ring 40 on each supply or discharge connection side and held in position by a support element 42 can be rotated into different switching positions using a spindle 50.

In the illustrated example embodiment, the ball 44 has a first bore 46 aligned with the fluid inlet or outlet 34 of the separation unit 12 and a vertical lateral second bore 48 coupled thereto. By rotating the ball 44 about the axis of the first bore 46, the second bore 48 can be selectively brought into flow communication with one of the supply or discharge connections 30, i.e. the second bore 48 is aligned with the corresponding supply or discharge connection 30 in the respective switching position.

Thus, in this example embodiment, four switching positions are possible in which the working connection 28 coupled to the fluid inlet or outlet 34 of the separation unit 12 is respectively in flow communication with exactly one of the four supply or discharge connections 30. This means that—depending on the mode of operation—fluid can be supplied to the separation unit 12 through a selected supply or discharge connection 30, or fluid can be discharged from the separation unit 12 through a selected supply or discharge connection 30.

The fluid distribution means is of course not limited to this example embodiment. Embodiments with switching positions in which a plurality of supply or discharge connections 30 can be brought into flow communication with the working connection 28 at the same time, also alternately with one or more of the other supply or discharge connections 30, are also possible. Selective blocking of the working connection 28 in combination with one of the other functionalities is basically also possible. However, the fluid distribution means can at least switch between two defined switching positions.

The spindle 50 of the fluid distribution means, which protrudes out of the housing 18 of the distributor cap 14 in the direction of the central axis of the separation unit 12, serves here as an interface for changing the switching positions. An actuating element 52 for manual operation may be coupled to the spindle 50, or the spindle 50 may be coupled to a motor-operated or otherwise operated actuating means which is coupled to a control unit.

For coupling two adjacent distributor caps 14, coupling means are provided which establish a rigid mechanical coupling on the one hand and a flow communication between the adjacent distributor caps 14 on the other hand. In particular a connector 54, here a double coupling (double male connector) serves as a coupling means, the first end of which is coupled to one of the supply or discharge connections 30 of the fluid distribution means of the first distributor cap 14. The connector 54 protrudes from the opening 32 of the associated main side wall 20 of the housing 18 and extends through the opening 32 of the opposite main side wall 20 of the housing 18 of the adjacent second distributor cap 14. The second end of the connector 54 is coupled to the associated supply or discharge connection 30 of the fluid distribution means of the second distributor cap 14. Within the housings 18, the connector 54 is respectively sealed by two O-rings 56 and fixed to the housing 18 by a securing element 58.

A flow channel 60 is formed inside the connector 54, which provides the flow communication between the two supply or discharge connections 30. The wall surrounding the flow channel 60 is so thick and stable that it can withstand high pressures (4 bar and possibly more). The length of the connector 54 is dimensioned such that the distributor caps 14 coupled to each other lie very close together or contact each other.

The geometric design of the distributor caps 14 and the connectors 54 determines a logical grid having defined locations where distributor caps 14 can be arranged for coupling to adjacent distributor caps 14. Due to the rigid connectors 54 as coupling means, a stable assembly of the distributor caps 14 is achieved.

FIG. 7 shows by way of example further types of connectors 54 including a hose barb 62 which can be used in place of the connector 54 shown in FIG. 5. Unused supply or discharge connections 30 can be closed with a blind plug 64 (see also FIG. 5). Each connector 54, each hose barb 62 and each blind plug 64 is sealed with respect to the housing 18 in which it is arranged by two O-rings 56 and fixed by a securing element 58.

FIG. 8 shows by way of example an assembly of distributor caps 14 arranged in a 3×2 grid. Due to the inclined secondary side walls 22, defined free spaces 66 are formed in this example despite the tight arrangement. Holding means 68 can be arranged in these free spaces 66 to fix the assembly to a frame 70, as shown in FIG. 9 as an example. Additional hose lines or the like can also be guided through the free spaces 66.

The distributor caps 14 and the adjustable fluid distribution means thereof permit an interconnection of separation units 12 in series and/or parallel. This will be briefly explained with reference to the process device arrangement 10 shown in FIGS. 1 and 2. In this exemplary arrangement, five different separation units 12 are connected in series, which differ, for example, in terms of filter material, pore size, etc. For easier orientation, these five separation units are marked with the additions (1) to (5). The fluid distribution means of the distributor caps 14 attached to the top and bottom of the separation units 12 are connected such that a flow path is obtained from an outer lower distributor cap 14 upwards through the associated first separation unit 12 (1) to the upper distributor cap 14 thereof, from there to the adjacent upper distributor cap 14 and downwards through the associated second separation unit 12 (2) to the lower distributor cap 14 thereof, etc. up to the upper distributor cap 14 of the last separation unit 12 (5) in the row. In this way, different separation steps can be carried out one after the other with only one process device arrangement 10, without the need for intermediate storage of medium.

The filter areas of the individual separation steps can be increased by connecting further separation units 12 in parallel. In the process device arrangement 10 shown in FIGS. 1 and 2, for example, a separation unit 12 (6) of the same type as the first separation unit 12 (1) is connected in parallel with the first separation unit 12 (1). The fluid distribution means of the lower distributor cap 14 of the first separation unit 12 (1) is connected such that the supplied medium is not only directed through the first separation unit 12 (1), but also to the laterally adjacent lower distributor cap 14 of the parallel separation unit 12 (6). The portion of the medium flowing through the parallel separation unit 12 (6) passes via the upper distributor cap 14 to the adjacent upper distributor cap 14 of the first separation unit 12 (1) and is directed from there, together with the other portion of the medium, to the upper distributor cap 14 of the second separation unit 12 (2).

Basically different configurations with other objectives are of course also possible, such as redundant arrangements to increase process reliability.

The flow paths through the process device arrangement 10 can be configured using the adjustable fluid distribution means of the distributor caps 14 before and during operation.

Figure 10:
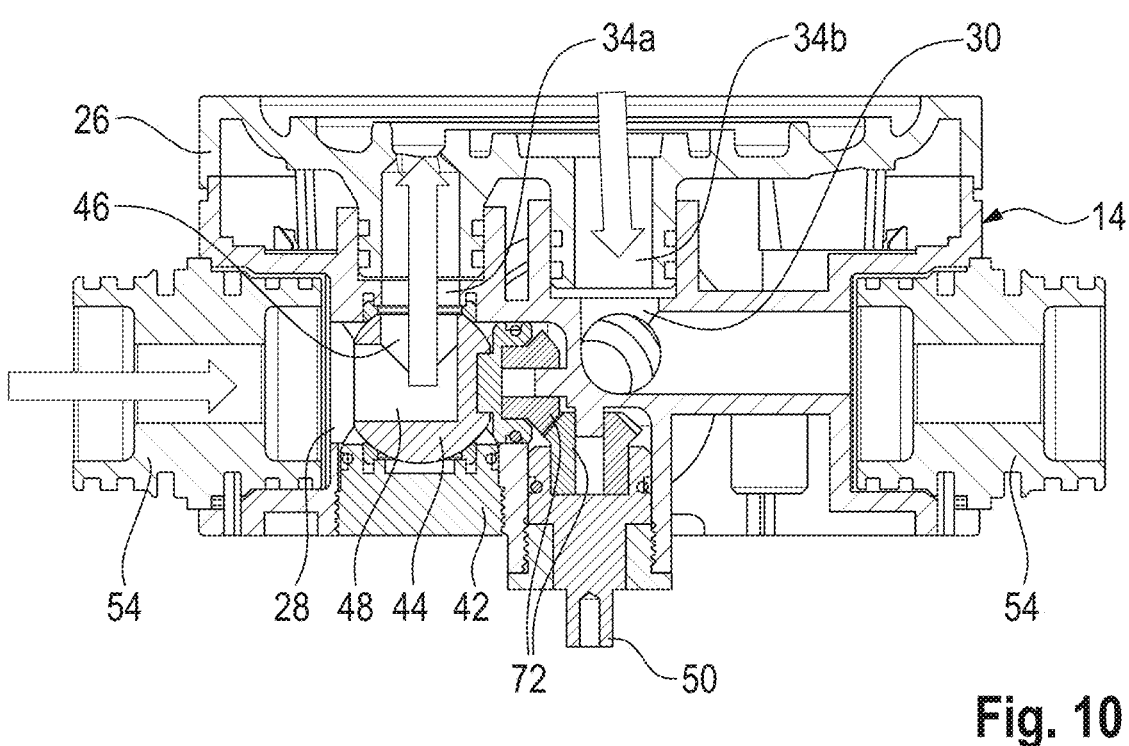
FIG. 10 shows a sectional view of a distributor cap according to a second embodiment.

Another type of distributor cap, here referred to as a T-style variant, is shown in FIG. 10. This type of distributor cap is adapted to separation units 12 the fluid inlet 34a and fluid outlet 34b of which are arranged on the same end face. In the operating position of the separation unit 12, this is usually the lower end face. With respect to the central axis of the separation unit 12, the fluid outlet 34b is arranged centrally, whereas the fluid inlet 34a is arranged radially offset thereto.

Accordingly, the working connection 28 of the T-style distributor cap 14 is arranged such that in the mounted state of the distributor cap 14, it is radially offset from the central axis of the separation unit 12 and establishes a flow communication with the fluid inlet 34a thereof. A supply or discharge connection 30 of the distributor cap 14, which is used as a discharge connection in this case, is aligned with the centrally arranged fluid outlet 34b of the separation unit 12, so that a flow communication is also established here.

The switchable fluid distribution means of the T-style distributor cap 14, which provides the working connection 28 and the discharge connection 30, is designed in this case as a ball valve 38 which can be brought into at least two different valve positions via a centrally arranged spindle 50 and a bevel gear 72.

The ball 44 of the ball valve 38 is sealed by sealing rings 40 and is held in position by a support element 42. In the illustrated example embodiment, the ball 44 has a first bore 46 aligned with the fluid inlet 34a of the separation unit 12 and a vertical lateral second bore 48 coupled thereto and aligned with the working connection 28 of the fluid distribution means. By rotating the spindle 50, the ball 44 is rotated via the bevel gear 72 about the axis of the second bore 48. The working connection 28 is thus moved away from the fluid inlet 34a of the separation unit 12 until there is no flow communication.

Thus, two switching positions are possible in this example embodiment. In the first switching position, there is a flow communication between the working connection 28 of the fluid distribution means of the distributor cap 14 and the fluid inlet 34a of the separation unit 12. In the second switching position, this flow communication is blocked.

The spindle 50 of the fluid distribution means, which projects out of the housing 18 of the distributor cap 14 in the direction of the central axis of the separation unit 12, serves here as an interface for changing the switching positions. An actuating element 52 for manual operation can be coupled to the spindle 50, or the spindle 50 is coupled to a motor-operated or otherwise operated actuating means which is coupled to a control unit.

Further switching possibilities by which the fluid exiting the fluid outlet 34b of the separation unit 12 could be selectively distributed to a particular one or a plurality of discharge connections 30 are not provided here, but are basically possible. For example, the fluid distribution means could provide a switchable diaphragm valve at each of the discharge connections 30.

The modular character of the device is shown—apart from the various interconnection possibilities of the distributor caps 14 with the associated separation units 12—by the fact that, on the one hand, the working connection 28 of a distributor cap 14—instead of a separation unit 12—can also be connected to a first functional unit 74, which will be discussed in more detail later, and that, on the other hand, the supply or discharge connections 30 of the fluid distribution means of the distributor caps 14 can also be used to connect second functional units 76 to the free sides of the distributor caps 14. In this context, such second functional units 76 do not mean additional distributor caps 14 or separation units 12, but special components which provide or enable additional functionality.

Figure 11:
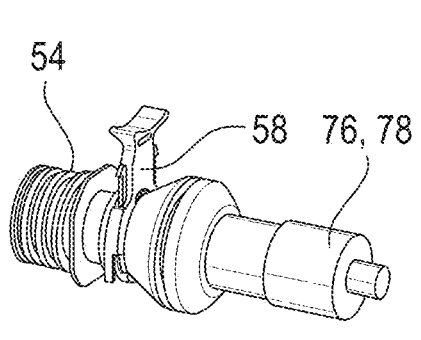
FIG. 11 shows a second functional unit in the form of a sensor.

FIG. 11 shows an example of such a second functional unit 76. A sensor 78 can be coupled to one of the supply or discharge connections 30 of the fluid distribution means of a distributor cap 14 via coupling means, here a suitable connector 54 and a securing element 58. This means that both a rigid mechanical coupling between the distributor cap 14 and the sensor 78 and a flow communication between the supply or discharge connection 30 and the sensor 78 are established.

Suitable sensors 78 include, for example, devices which measure pressure, flow, viscosity, pH or electrical conductivity. Spectroscopic measuring devices (UV-VIS, NIR, Raman etc.) are also possible. The measured values of the sensor 78 can be used, for example, for downstream control of the process device arrangement 10.

Figure 12:
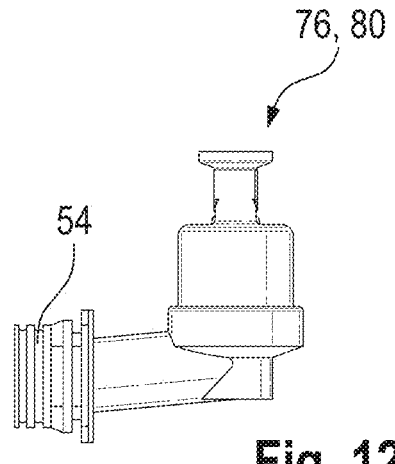
FIG. 12 shows a second functional unit in the form of a venting unit.

FIG. 12 shows a further second functional unit 76 in the form of a venting means 80, which can also be connected to a supply or discharge connection 30 of the fluid distribution means of a distributor cap 14 using a suitable connector 54 (see also FIGS. 1 to 3).

A second functional unit 76 may also be connected to a supply or discharge connection 30 of the fluid distribution means of a distributor cap 14 via a flexible hose line, for example by means of a hose barb 62 fixed to the housing 18 of the distributor cap 14.

A practical example is shown in FIG. 13, which is briefly explained below. The process device arrangement 10 shown in FIG. 13 comprises six separation units 12 in the form of filter capsules of the same design, which are arranged in a compact 3×2 grid and are each provided with distributor caps 14 on their two end faces (unfiltrate side and filtrate side). The separation units 12 are connected in parallel by means of the distributor caps 14 to provide a generally large filter area.

A supply or discharge connection 30 of an upper distributor cap 14, to which a supply hose line 82 is connected, serves as a common feed for all separation units 12. The fluid distribution means of the upper distributor caps 14 are connected such that the fluid supplied via the supply hose line 82 is distributed to all separation units 12.

The fluid distribution means of the lower distributor caps 14 are in turn connected such that fluid exiting from all separation units 12 is directed to a specific supply or discharge connection 30 of a lower distributor cap 14, which serves as a common outlet. A discharge hose line 84 is connected to this supply or discharge connection 30.

The fluid distribution means of the upper distributor caps 14 can also be adjusted such that the working connections 28 thereof are all coupled to a different supply or discharge connection 30 of an upper distributor cap 14. This supply or discharge connection 30 serves as a common venting connection to which a venting means 80 is connected via a venting hose line 86. In the operating position of the process device arrangement 10, the venting means 80 is arranged above the upper distributor caps 14, so that no supplied fluid enters the venting means 80 under normal operating conditions. For this purpose, the venting means 80 is fixed to a holding means 68 in the form of a rod which extends upwards from one of the free spaces 66 between the upper distributor caps 14. All separation units 12 can be vented together via the venting means 80. Due to the adjustment possibilities of the fluid distribution means, the supply or discharge connection 30 serving as venting connection can also be used to perform a common integrity test for all separation units 12.

Another possibility of using the distributor caps 14 in a process device arrangement 10 is to couple the working connection 28 of the distributor cap 14 not to the fluid inlet or outlet 34 of a separation unit 12, but to a fluid inlet or outlet 34 of a first functional unit 74, as shown by way of example in FIG. 14. This means that at one or more locations of the process device arrangement 10, instead of a separation unit 12, a first functional unit 74 is integrated into a flow path or arranged at the beginning or end of a flow path, as shown by way of example in FIG. 15.

To allow the first functional unit 74 to be connected to a distributor cap 14 in the same manner as a separation unit 12, it has a fluid inlet or outlet 34 corresponding to that of a separation unit 12. Thus, the first functional unit 74 is compatible with the distributor caps 14. Similarly to the separation units 12, it is in principle possible to provide the first functional unit 74 with a fluid inlet or outlet 34 on the other end face as well, so as to enable a flow through the first functional unit 74 and the connection of a further distributor cap 14 on the other end face (see in particular FIG. 15).

In the example embodiment shown in FIGS. 14 and 15, the first functional unit 74 is a combination of a UV sensor 88 and a conductivity and pH sensor 90. In addition, in the process device arrangement 10 shown in FIG. 15, two first functional units 74 are provided in the form of pumps 92, each of which is arranged between two distributor caps 14 and conveys fluid from the working connection 28 of the upper distributor cap 14 to the working connection 28 of the lower distributor cap 14, or—as required—vice versa.

Further examples of first functional units 74, which can be connected individually or in combination to one or two working connections 28 of distributor caps 14, are sensor(s), static mixers, reservoirs or intermediate storage tanks, sampling means and venting means, the list being not exhaustive. A first functional unit 74 in this sense can also comprise only functionally essential parts of such units. A simple form of such a first functional unit 74 is an empty pipe.

Regardless of the final configuration of the process device arrangement 10, all distributor caps 14 and at least all separation units 12 directly attached to the distributor caps 14 and, if applicable, all first and second functional units 74, 76 and other components (e.g. hose lines) are designed as disposable components, i.e. they are intended for single use and accordingly formed from suitable plastic materials. The entire process device arrangement 10 is pre-sterilized before it is put into operation, so as to be ready for immediate use.

On the other hand, the modular structure of the device allows it to be disassembled and cleaned after use, e.g. by backwashing, so that reuse of the entire device or parts of the device is basically possible. However, reuse depends in particular on the separation units 12 used and the regulatory conditions of the environment.

To prevent destruction of the modular device by over-pressure, a valve, a burst diaphragm or similar means can be attached to one or more of the unused supply or discharge connections 30 and/or working connections 28 of the distributor caps 14, which opens in the event of overpressure and releases the pressure to the environment or into a connected container.

A modular device as described above with reference to a plurality of examples can be used in the biopharmaceutical industry, in particular for performing one or more process steps in a downstream process. However, the invention is not limited to such an application. Among other things, use in bind/elute and flow-through processes is possible in the context of membrane and column chromatography applications. Some more specific cases of application are described below.

The modular device can be used in a process device arrangement 10 for dividing a larger volume of a medium into a plurality of small units, e.g. for distributing the contents of a large bioreactor into a plurality of bags. By using the modular device, a plurality of distributor caps 14 having integrated fluid distribution means can be connected for this purpose such that the medium to be distributed is first fed into a first distributor cap 14 and, from here, through one or more separation units 12. This can be a parallel connection of similar separation units 12 or a series connection of different separation units 12.

Subsequently, different variants for further fluid routing are possible. They all have in common that the distributor caps 14 are coupled to one or more sub-volumes (containers, e.g. bags) via one or more of their supply or discharge connections 30.

When the sub-volume(s) connected to the distributor cap 14 is/are filled, the fluid distribution means in the distributor cap 14 switches so that the supply or discharge connection(s) 30 are closed and, at the same time, the flow path via another supply or discharge connection 30 to the adjacent distributor cap 14 is opened. Alternatively, a coupling to a first functional unit 74 (in the simplest case only a fluid line, possibly with flow or bubble sensors, or a separation unit 12) can be used via the permanently open working connection 28. Thus, a connection can be formed to a further distributor cap 14 at the other end of the first functional unit 74 or separation unit 12, which in turn is coupled to one or more sub-volumes via one or more of the supply or discharge connections 30 thereof. This principle can be continued in the same way for any number of distributor caps 14 and sub-volumes.

Figure 16:
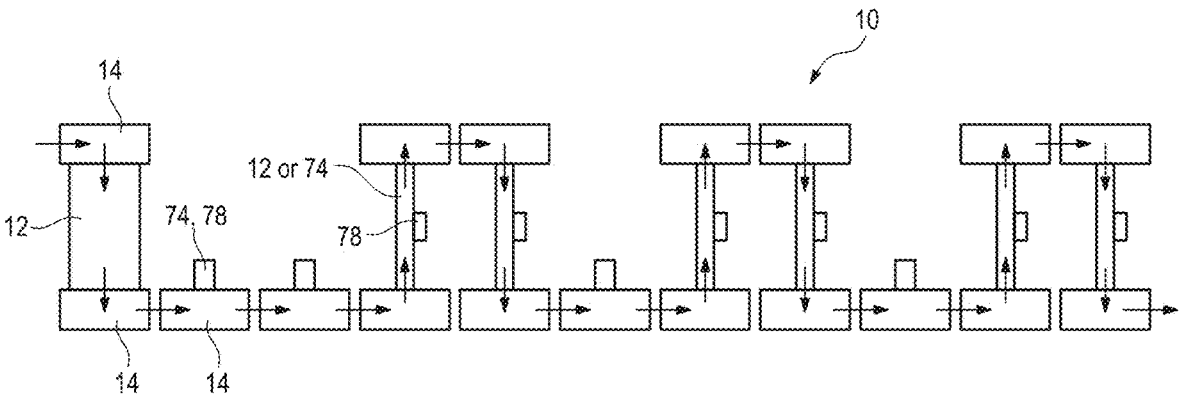
FIG. 16 shows a schematic representation of a process device arrangement according to the invention for dividing a large volume of medium.

FIG. 16 shows schematically and by way of example how such a process device arrangement 10 may be structured. In the illustration of FIG. 16, the flow paths are marked with arrows. Not shown are the supply or discharge connections 30 and the sub-volumes coupled thereto. In this exemplarily illustrated linear process device arrangement 10, for a coupling to a sub-volume, a maximum of two supply or discharge connections 30 are available in the lower distributor caps 14 and a maximum of three supply or discharge connections 30 are available in the upper distributor caps.

Figure 17:
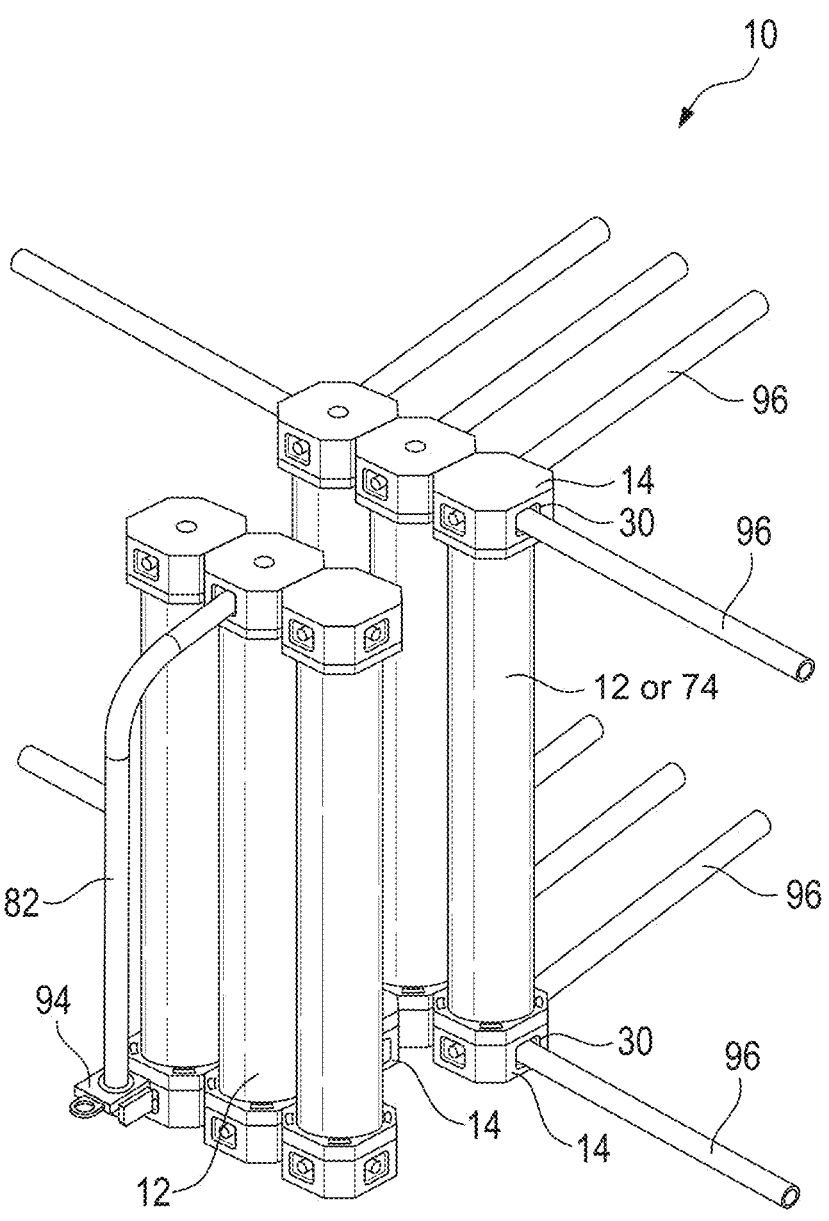
FIG. 17 shows a variant of a process device arrangement according to the invention for dividing a large volume of medium.

FIG. 17 shows a non-linear process device arrangement 10 having a branched arrangement of distributor caps 14. The two lower distributor caps 14 of the middle separation units 12 or first functional units 74 are coupled to each other via a distributor cap 14 arranged therebetween, which is not visible. The medium to be separated is supplied here via the supply line 82 provided with a sterile connector 94. The filling lines 96 coupled to the supply or discharge connections 30 lead to the sub-volumes (not shown).

The modular device can also be enable an at-line analysis. This requires a non-continuous branching of part of the medium to be processed during the running process. The branched-off medium can then be analyzed using various analytical methods, such as spectroscopic or chemical reactive methods.

The function of segregating a portion of the medium may be performed via a switchable supply or discharge connection 30 of a distributor cap 14. The analytical metric may be connected directly to another supply or discharge connection 30 of this distributor cap 14. Alternatively, the medium separation function may be integrated into a first functional unit 74 connected to a working connection 28 of a distributor cap 14. The first functional unit 74 may further include the corresponding interface for connecting the analytical metric, or it may be connected via the distributor cap 14 attached to the other end of the first functional unit 74 in the manner described above.

In certain cases of application, mixing of the medium is desired. A mixing effect can be achieved or supported by a purposeful circulation of the medium in a separation unit 12 or first functional unit 74. To this end, one supply or discharge connection 30 on the associated upper distributor cap 14 is respectively coupled to one supply or discharge connection 30 of the associated lower distributor cap 14 of the separation unit 12 or first functional unit 74, so that a closed circuit results at least briefly for mixing purposes. The coupling can also be made indirectly, i.e. the coupling between the upper and lower supply or discharge connections 30 does not necessarily have to be made at the distributor caps 14 attached directly to the separation unit 12 or the first functional unit 74. However, a pump should be involved in the coupling, as the flow must be initiated in some other way.

In general, the separation units 12 and, if applicable, the first functional units 74 can be mechanically and fluidically coupled to each other by means of the distributor caps 14, more specifically—if present—via the distributor caps 14 attached to the bottom and/or top of the separation units 12 or first functional units 74. It is also possible to couple separation units 12 or first functional units 74 of different heights to each other, in which case adjacent separation units 12 or first functional units 74 can be coupled either only via the upper or only via the lower distributor caps 14.

Figure 18:
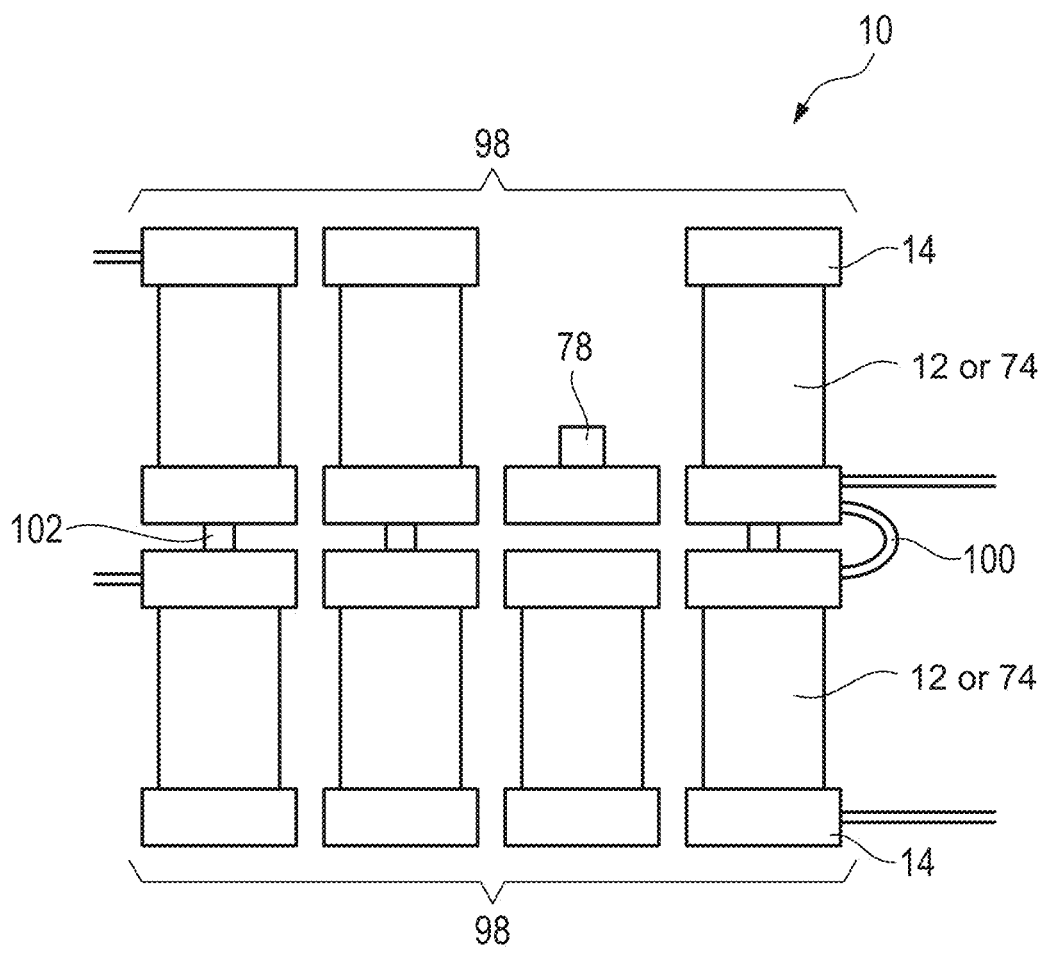
FIG. 18 shows a schematic representation of a process device arrangement according to the invention having a space-saving structure.

A space-saving structure of a process device arrangement 10 having a reduced footprint can be achieved by a super-imposed arrangement of sub-units 16, as exemplarily shown in FIG. 18. A plurality of such sub-units 16 comprising a separation unit 12 or a first functional unit 74 and at least one distributor cap 14 are combined to form a module assembly 98. For example, one module assembly 98 can respectively be configured for a plurality of process steps. These module assemblies 98 can preferably be stacked directly, but also indirectly on top of each other.

If a fluid connection between the module assemblies 98 is desired, for example to interconnect two process steps, this can be established via coupling lines 100 connected to free lateral supply or discharge connections 30 of the distributor caps 14.

Fluid connections can also be realized via vertically aligned coupling connections 102 of the fluid distribution means of the distributor caps 14, which are opposite the working connections 28, in particular for the parallel connection of interlinked separation units 12.

LIST OF REFERENCE NUMERALS

10 Process device assembly
12 Separation unit
14 Distributor cap
16 Sub-unit (module)
18 Housing
20 Main side wall
22 Secondary side wall
24 Lid
26 Bottom or lid portion
28 Working connection
30 Supply or discharge connection
32 Opening
34 Fluid inlet or outlet
34*a* Fluid inlet
34*b* Fluid outlet
36 Mounting means
38 Ball valve
40 Sealing ring
42 Support element
44 Ball
46 First bore
48 Second bore
50 Spindle
52 Actuating element
54 Connector
56 O-ring

58 Securing element
60 Flow channel
62 Hose barb
64 Blind plug
66 Free space
68 Holding means
70 Frame
72 Bevel gear
74 First functional unit
76 Second functional unit
78 Sensor
80 Venting means
82 Supply hose line
84 Discharge hose line
86 Venting hose line
88 UV sensor
90 Conductivity and pH sensor
92 Pump
94 Sterile connector
96 Filling line
98 Module assembly
100 Coupling line
102 Coupling connection

The invention claimed is:

1. A modular device for a fixed arrangement and interconnection of individual separation units and/or first functional units for performing one or more unit operations in a biotechnological process, wherein the modular device comprises a plurality of distributor caps, of which at least one distributor cap is provided for attachment to a separation unit and one or more further distributor caps are each provided for attachment to a further separation unit or a first functional unit, wherein the distributor caps each have:

a fluid distribution means having a working connection and at least two supply or discharge connections, wherein the fluid distribution means can assume at least two defined switching positions, wherein the at least two switching positions of the fluid distribution means enable:

a selective opening or blocking of a flow communication between the working connection and at least one supply or discharge connection; and/or a selective opening or blocking of flow communications between the working connection and a plurality of specific or all supply or discharge connections;

connection means for establishing a flow communication between a fluid inlet or outlet of the separation unit or the first functional unit and the working connection of the fluid distribution means;

coupling means for establishing both a rigid mechanical coupling and a flow communication with an adjacent distributor cap, wherein a rigid connector serving as the coupling means between a first distributor cap an adjacent second distributor cap establishes the rigid mechanical coupling and at a same time the flow communication between a supply or discharge connection of the fluid distribution means of the first distributor cap and a supply or discharge connection of the fluid distribution means of the adjacent second distributor cap; and an interface for manually or automatically changing the switching positions of the fluid distribution means.

2. The modular device according to claim 1, characterized in that the distributor caps comprise mounting means for fixedly attaching the distributor cap to an end of a housing of a separation unit or a first functional unit.

3. The modular device according to claim 1, characterized in that all or at least a plurality of the distributor caps have a same shape and a same size and the supply or discharge connections, if any, are each arranged at a same location.

4. The modular device according to claim 1, characterized in that the supply or discharge connections of the fluid distribution means lie in a plane which is oriented perpendicularly to an axial direction of the working connection.

5. The modular device according to claim 1, characterized in that the fluid distribution means comprises four supply or discharge connections arranged at angular intervals of 90°.

6. The modular device according to claim 1, characterized in that the distributor caps are in a form of a straight cylinder, a base and a top surface of which are circular, or are an equiangular polygon.

7. The modular device according to claim 1, characterized in that in at least one distributor cap, the fluid distribution means comprises at least one valve, including a ball valve and/or a diaphragm valve.

8. The modular device according to claim 7, characterized in that the valve is a multi-way valve with a plurality of valve positions, by means of which different flow communications between the working connection and the supply or discharge connections and/or between the supply or discharge connections can be set, wherein the working connection is arranged centrally in the distributor cap with respect to a plane perpendicular to its axial direction.

9. The modular device according to claim 1, characterized in that in at least one distributor cap provided for attachment to a separation unit, the working connection is arranged so as to be arranged radially offset with respect to a central fluid outlet of the separation unit, so that when the distributor cap is attached to the separation unit, the working connection is brought into flow communication with a correspondingly offset fluid inlet of the separation unit.

10. The modular device according to claim 9, characterized in that in at least one distributor cap, the fluid distribution means comprises at least one valve, characterized in that the valve is a ball valve which can be brought into at least two different valve positions via a centrally arranged spindle and a bevel gear.

11. The modular device according to claim 1, characterized in that sterile connectors or hose barbs or blind plugs are attached to the supply or discharge connections, which are each fixed to a securing element which further snaps into a latching means formed on a housing of the distributor cap.

12. The modular device according to claim 1, characterized in that at least in one distributor cap, a second functional unit is connected to at least one of the supply or discharge connections.

13. The modular device according to claim 1, characterized in that an overpressure protection means, including a burst diaphragm, which releases a corresponding connection when a limit pressure is exceeded is attached to at least one working connection or supply or discharge connection.

14. A modular device for a fixed arrangement and interconnection of individual separation units and/or first functional units for performing one or more unit operations in a biotechnological process, wherein the modular device comprises a plurality of distributor caps, of which at least one distributor cap is provided for attachment to a separation unit and one or more further distributor caps are each provided for attachment to a further separation unit or a first functional unit, wherein the distributor caps each have:

a fluid distribution means having a working connection and at least two supply or discharge connections, wherein the fluid distribution means can assume at least two defined switching positions;

connection means for establishing a flow communication between a fluid inlet or outlet of the separation unit or the first functional unit and the working connection of the fluid distribution means;

coupling means for establishing a rigid mechanical coupling and a flow communication with an adjacent distributor cap; and an interface for manually or automatically changing the switching positions of the fluid distribution means, wherein, in at least one distributor cap provided for attachment to a separation unit, the working connection is arranged so as to be arranged radially offset with respect to a central fluid outlet of the separation unit, so that when the distributor cap is attached to the separation unit, the working connection is brought into flow communication with a correspondingly offset fluid inlet of the separation unit, and wherein, in at least one distributor cap, the fluid distribution means comprises at least one valve, wherein the valve is a ball valve which can be brought into at least two different valve positions via a centrally arranged spindle and a bevel gear.

* * * * *